Figure 1:
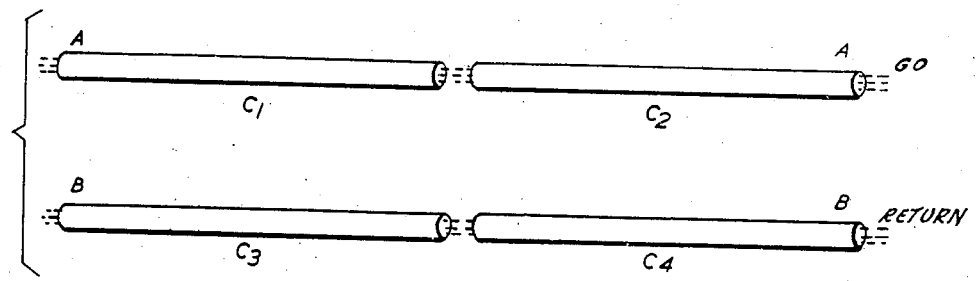

April 26, 1949.    H. W. SILCOCK    2,468,124
ELECTRIC COMMUNICATION CABLE
Filed Sept. 26, 1944

Inventor
Howard Walker Silcock
By
Attorney

Patented Apr. 26, 1949

2,468,124

UNITED STATES PATENT OFFICE 2,468,124

ELECTRIC COMMUNICATION CABLE

Howard Walker Silcock, Aldwych, London, England, assignor, by mesne assignments, to International Standard Electric Corporation, New York, N. Y., a corporation of Delaware Application September 26, 1944, Serial No. 555,796
In Great Britain September 3, 1943

Section 1, Public Law 690, August 8, 1946
Patent expires September 3, 1963

3 Claims. (Cl. 174—34)

The present invention relates to electric communication cables, and is concerned particularly with improvements in the methods of installing and connecting manufactured cable lengths to form long cable sections.

A section of a communication cable connecting two stations usually comprises a number of separate conductor pairs and is generally composed of a number of comparatively short lengths of cable made in the factory and shipped separately to the route where they are installed in position, the conductors of adjacent lengths being afterwards connected together to complete the section. In cases where the cable conductors are used to convey multi-channel carrier currents, it is a usual practice to provide separate cables, called the go and return cables, to convey the currents for the two directions of transmission. Owing to the unavoidable manufacturing variations in the factory lengths it is necessary to allocate them along the route in accordance with measurements made before shipment so that the impedance discontinuities which occur along the section are kept sufficiently small to prevent large impedance irregularities in any of the conductor pairs of the section.

It has hitherto been the practice to allocate the factory lengths for the go and return cables separately so that each shall meet the impedance requirements. In order that the desired results may be obtained, it is necessary that the installation lengths should be relatively short compared with the shortest wave-length to be transmitted, and it has been found that the most convenient factory length from the manufacturing and/or shipping point of view may be too great to meet this requirement. The object of the present invention is to lay down a procedure by which these conflicting requirements may be conveniently met and which also enables the go and return cables to be allocated simultaneously instead of separately as in the prevailing practice.

Accordingly, the invention provides a method of constructing a pair of multi-conductor cable sections which comprises connecting in two tandem series the respective members of a plurality of pairs of elementary units, each of the said pairs of elementary units being obtained by selecting two substantially equal factory lengths of cable the average of whose mean impedances is within predetermined limits, installing the said factory lengths side-by-side, cutting each factory length into the same even number of substantially equal installation lengths, and cross-jointing the conductors at the adjacent ends of the installation lengths at the odd numbered cutting points.

The invention also provides a method of installing a pair of multi-conductor cable sections which comprises selecting a plurality of pairs of factory lengths of cable in such manner that the average of the mean mutual capacities for the two members of each pair is within predetermined limits, installing the selected pairs in succession on the cable route with the members of each pair side-by-side, cutting each pair of factory lengths into two substantially equal installation lengths, cross-jointing the conductors at the adjacent cut ends of the pairs of installation lengths to form a pair of elementary units, and connecting respectively in tandem the members of the successive pairs of elementary units.

By a variation according to the invention, the cutting of the factory lengths into installation lengths is effected before installation instead of afterwards.

According to another feature of the invention there is provided a pair of multi-conductor cable elementary units comprising a pair of factory cable lengths each of which is cut into the same even number of substantially equal installation lengths which are re-jointed together at the odd numbered cutting points in such a manner that any two installation lengths connected together at each said odd numbered point are derived from different factory lengths, each of the said pairs of factory lengths having been previously so selected that the average of the mean impedances for the two members of the pair is within predetermined limits.

Figure 2:
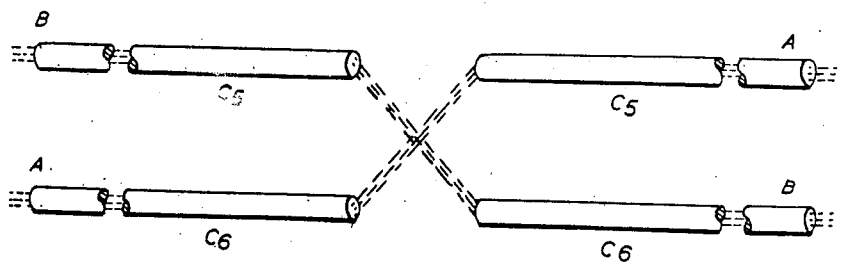

The invention will be described with reference to the accompanying drawing in which Fig. 1 shows diagrammatically a method of allocating factory lengths for a pair of multi-conductor cables which has been previously used, and Fig. 2 shows diagrammatically an example of the method according to the present invention.

In this specification a number of terms will be used for convenience. These terms are defined as follows:

A factory cable length is the smallest manufactured length tested in the factory as a unit after sheathing (or armouring). It is generally also the unit length shipped from the factory, but not necessarily so.

An installation cable length is the smallest length of cable tested as a unit during installation. It may be the same as a factory length, but not necessarily so, and in cables installed according to the present invention the installation length is a fraction of a factory length.

A cable section is a length of cable connecting two repeater stations, terminal points, or the like, and is made up of a relatively large number of installation or factory lengths.

Allocation is arrangement of the order of the installation or factory lengths making up a cable section according to a definite scheme depending on the measured impedance of the conductor pairs (or on some measured parameter representative of the impedance).

An elementary unit of a cable section comprises two or more installation lengths jointed together to form a length in which the mean impedance of the conductor pairs or the mean value of some parameter representative of the impedance) is within certain permissible limits.

In multi-conductor carrier cables, the principal cause of variation of the impedance is generally the variation of the mutual capacity per unit length of the conductor pairs, and the allocation is usually made on the basis of mutual capacity measurements. Thus, it is found, for example, that if any two approximately equal factory lengths be chosen at random, and the mutual capacities of all the pairs in each length be measured, the values obtained will usually vary over about the same percentage range in each, but the mean of all the values for one length is likely to be different from the mean for the other. If such factory lengths were connected together haphazard to form a cable section, these variations would result in impedance discontinuities producing appreciable reflections, so that the impedances of many of the pairs would be found to have serious irregularities. For this reason it is necessary to allocate the cable lengths to avoid large discontinuities.

One method of allocation which has been previously used is illustrated in Fig. 1. This shows four factory lengths of cable each of substantially the same length L and installed in two adjacent pairs of lengths to form elementary units of the go and return cables, which are designated A and B respectively. The two lengths of the A cable are selected so that the mean mutual capacities per unit length are $C_1$ and $C_2$ such that $$\frac{C_1+C_2}{2}$$

is equal to the standard value $C_A$ desired for the whole A cable section, within certain permissible limits. Likewise the two lengths of the B cable are selected so that their mean mutual capacities for unit length are $C_3$ and $C_4$ where $$\frac{C_3+C_4}{2}$$

is equal to $C_B$, the standard value for the B cable, which will normally be the same, or nearly the same, as $C_A$.

The A and B cables are then made up by connecting in tandem the required number of such elementary units and provided that L is sufficiently small compared with the shortest wavelength to be transmitted, then each elementary unit will behave substantially as a single cable length 2L in which the mean mutual capacity per unit length is $C_A$ (or $C_B$). The impedance of each cable section will thus be practically uniform throughout and there will be no appreciable reflections resulting in impedance irregularities. In this case the installation lengths and factory lengths are the same, and it will be noted that by this method the A and B cables are separately allocated.

As already mentioned, however, the maximum installation length L which can be satisfactorily used to obtain substantially uniform mutual capacity may be inconveniently small from the point of view of economical manufacture and/or shipment. The method of allocation according to the invention permits the factory length to be greater than the installation length, and at the same time enables both cables to be simultaneously allocated. This method is illustrated in Fig. 2, which shows a particular case in which the factory length may be 2L, for example, while the installation length is still L.

Two factory lengths 2L are selected in which the mean mutual capacities per unit length are $C_5$ and $C_6$ where $$\frac{C_5+C_6}{2}$$

is equal to the desired standard value C for both cables within the allowable limits. These lengths are then installed side-by-side and are cut at a point midway between the ends. The installation lengths so obtained are then cross-jointed as indicated in Fig. 2 so that the resulting elementary units of the A and B cables each comprise half of one factory length and half of the other factory length, so that the mean mutual capacity per unit length will be approximately equal to C for each elementary unit. This process assumes that the mean mutual capacity per unit length of each half of the factory length is the same as that for the whole length. While this may be only approximately true, it has been found that by suitable choice of the allocation limits, the method of the invention gives results substantially equal to those obtained by the method of separate allocation described with reference to Fig. 1.

It is to be noted that although it may be convenient to manufacture the cable in factory lengths of 2L, it may be preferable to ship the cable in lengths of L. In this case the cutting may be done in the factory, and the cable shipped in four separate installation lengths and installed in pairs side-by-side according to the scheme of Fig. 2. It is also to be noted that the cutting into installation lengths might be done at some intermediate stage during manufacture (for example, after sheathing, but before armouring) if convenient.

The principle described with reference to Fig. 2 may be extended to allow the factory lengths to be some even multiple of the installation length L which is greater than 2. In this case the two factory lengths will be selected in the same way but will be cut into a corresponding number of approximately equal lengths, the short installation lengths so obtained being cross-jointed at each cutting point in the manner indicated in Fig. 2. The A and B cable sections will then be composed of a series of elementary units each of which comprises a number of installation lengths taken alternately from each of the two factory lengths. The effective mean mutual capacity per unit length will be substantially equal to C as before.

Strictly, cross-jointing is only necessary at the odd numbered joints counting from one end of the elementary unit; however, any even numbered joint may be cross-jointed, or not, as may be convenient.

It will be noted that according to the method of the invention, the elementary unit is substantially equal in length to the factory length and comprises an even number of installation lengths.

While the allocation is most commonly carried out on the basis of the mutual capacities of the conductor pairs, the ultimate purpose is to secure impedance uniformity. It will be understood therefore that the allocation might be alternatively based upon actual impedance measurements, or on measurements of some parameter representative of the impedance other than the mutual capacity. The method of the invention is clearly applicable whatever may be the basis of the allocation.

It will be understood that the terms "average mean impedance" or "average mean mutual capacity" for two cable lengths, and like terms, employed in the claims, signify the average of the two mean values of the impedances (or mutual capacities) of all the conductor pairs of the two cable lengths, respectively.

Also, the term "cross-jointing" refers to the cross-connecting of the conductors of the cut ends of two pairs of installation lengths in the manner described with reference to Fig. 2.

What is claimed is:

1. A pair of multi-conductor cable sections extending lengthwise of each other in spaced relation and each composed of the same number of substantially co-extensive installation units, said units being divisible into even-numbered groups of units having substantially the same mean impedance, as determined by the measurement of a suitable parameter, and being tandem-connected in such a manner that any given unit is jointed directly to at least one unit belonging to the same group as the unit lying alongside said given unit, the average of the mean impedances between said given unit and any unit of said group being within predetermined limits.

2. A pair of cable sections in accordance with claim 1, wherein the length of each installation unit is relatively short compared with the shortest wave-length to be transmitted over said sections.

3. A pair of cable sections in accordance with claim 1, wherein said parameter is the mutual capacity of the conductor pairs within each unit.

HOWARD WALKER SILCOCK.

REFERENCES CITED

The following references are of record in the file of this patent:

UNITED STATES PATENTS

| Number | Name | Date |
| --- | --- | --- |
| 1,512,930 | Hitchcock | Oct. 28, 1924 |
| 1,720,616 | Werren | July 9, 1929 |